H. I. HANSON.
SAW FILING MACHINE.
APPLICATION FILED AUG. 9, 1915.
1,165,248.
Patented Dec. 21, 1915.
2 SHEETS—SHEET 1.
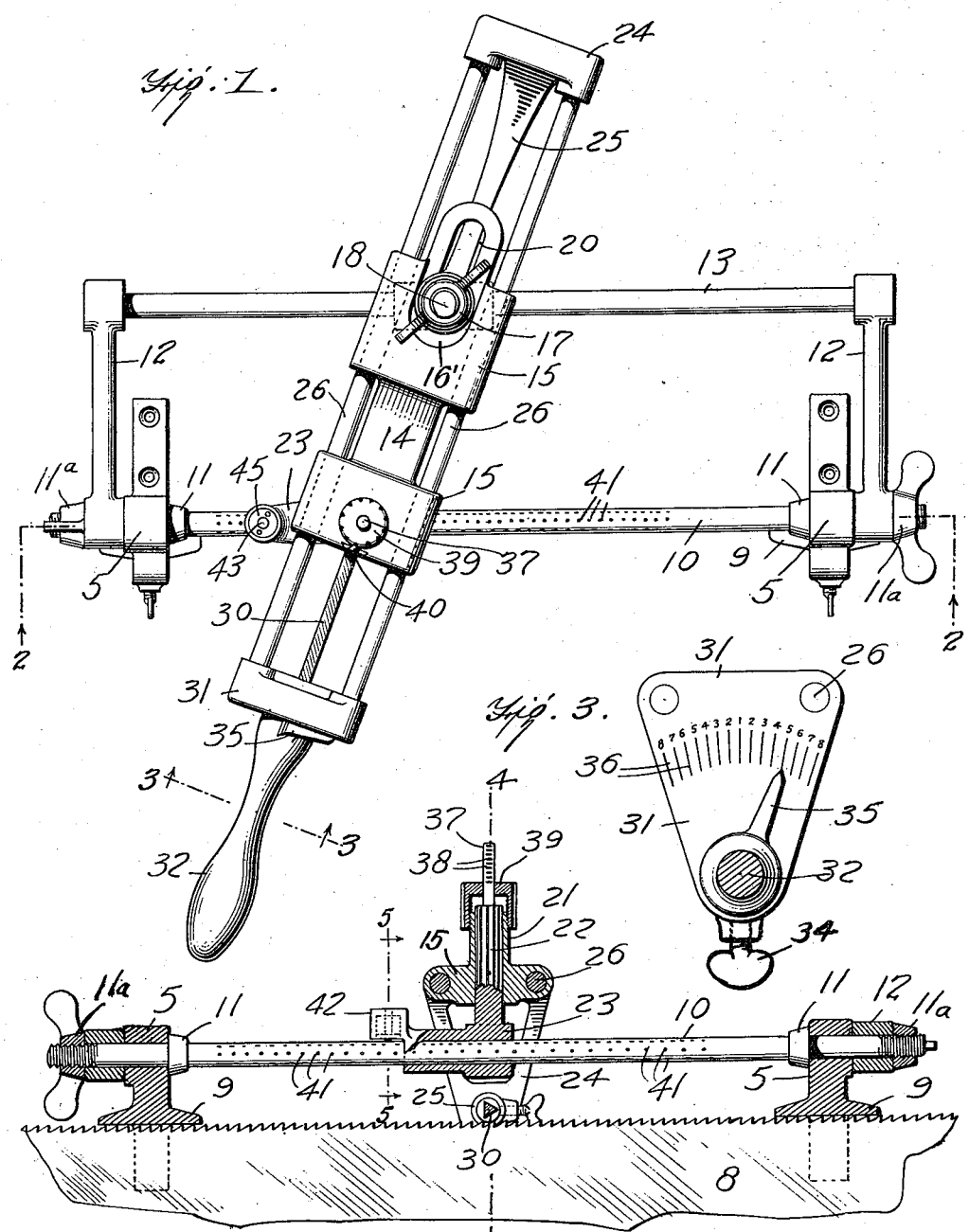
WITNESSES:
INVENTOR
HJALMAR I. HANSON,
BY Munn & Co.
ATTORNEYS H. I. HANSON.
SAW FILING MACHINE.
APPLICATION FILED AUG. 9, 1915.
1,165,248.
Patented Dec. 21, 1915.
2 SHEETS—SHEET 2.
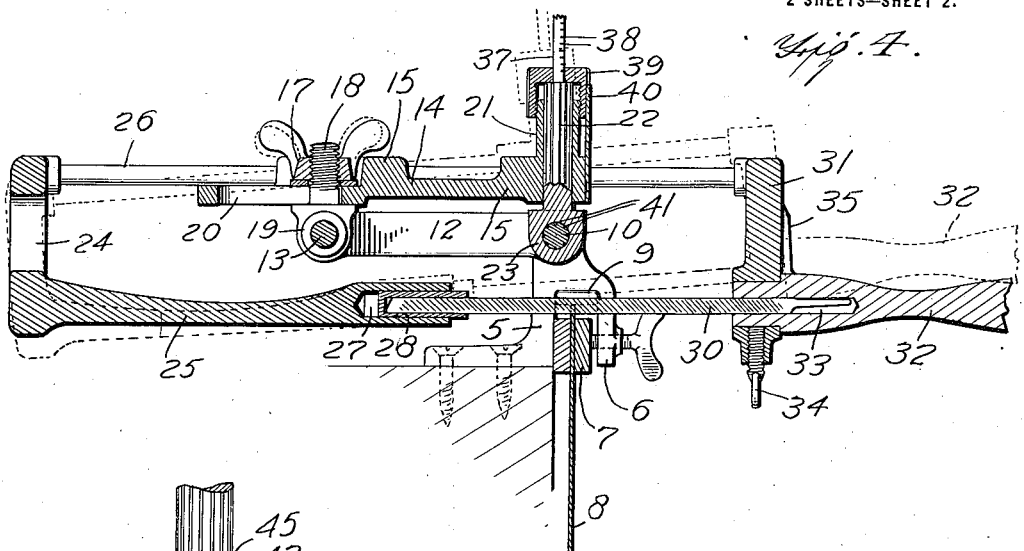
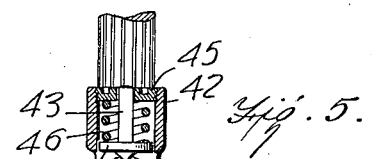
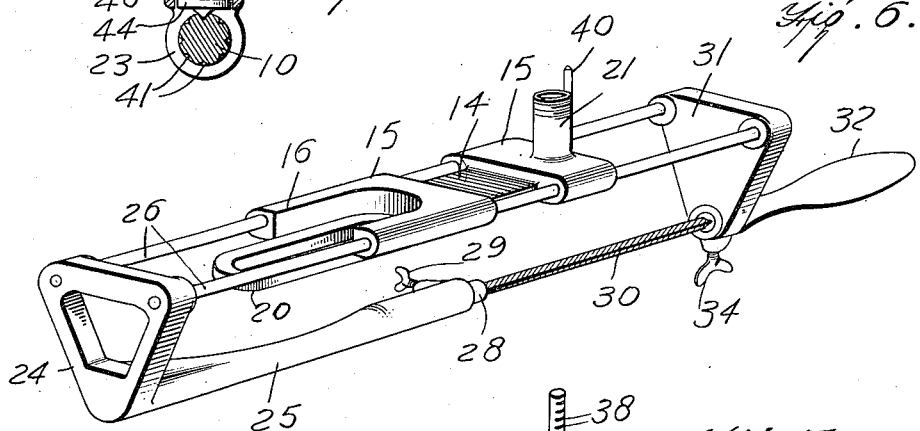
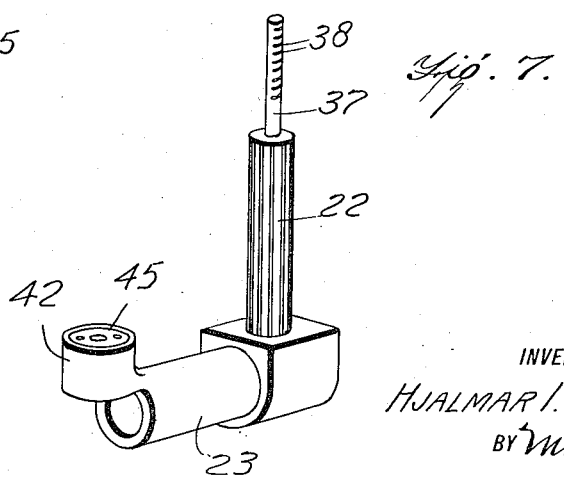
WITNESSES:
INVENTOR
HJALMAR I. HANSON,
BY Munn & Co.
ATTORNEYS

UNITED STATES PATENT OFFICE.

HJALMAR INGOLF HANSON, OF SUMMIT, SOUTH DAKOTA.

SAW-FILING MACHINE.

1,165,248.  Specification of Letters Patent.  Patented Dec. 21, 1915.

Application filed August 9, 1915. Serial No. 44,553.

*To all whom it may concern:*

Be it known that I, HJALMAR I. HANSON, a citizen of the United States, and a resident of Summit, in the county of Roberts and State of South Dakota, have invented a certain new and useful Improvement in Saw-Filing Machines, of which the following is a specification.

One of the principal objects of the invention is to provide a saw filing machine having improved means for closely and accurately acquiring adjustments of pitch, depth, and angle, whereby the file may be made to accommodate itself to the variations in the teeth of different saws, and whereby exact and uniform work may be done on the saw teeth.

A further object of the invention is to provide a saw filing machine including a horizontally arranged supporting frame capable of adjustment rotatably upon an axis and serving to slidably support a carriage upon which the file holder or frame is carried, means being provided whereby the supporting frame and carriage may be adjusted in various positions to acquire the proper relation of the file relatively to the saw.

Another object of the invention is to provide a saw filing machine having means for accurately determining the position to be assumed by the carriage in moving longitudinally of the saw blade, in order that the file may be shifted along the saw blade at uniform distances so as to accurately space the saw teeth.

Still another object of the invention is to provide a device of the class described which will be extremely simple, durable, efficient in operation, and inexpensive to manufacture.

With these and other objects in view which will become apparent as the description proceeds the invention resides in the construction, combination, and arrangement of parts hereinafter more fully described and claimed and illustrated in the accompanying drawings in which like characters of reference indicate like parts throughout the several figures, of which—

Figure 1 represents a top plan view of a saw filing machine constructed according to my invention. Fig. 2 represents a vertical longitudinal sectional view taken therethrough on the plane indicated by the line 2—2 of Fig. 1 looking in the direction indicated by the arrows. Fig. 3 represents a view in section taken vertically and transversely through the file holder on the plane indicated by the line 3—3 of Fig. 1. Fig. 4 represents a view in section taken vertically and transversely through the machine on the plane indicated by the line 4—4 of Fig. 2. Fig. 5 represents a vertical transverse sectional view taken on the plane indicated by the line 5—5 of Fig. 2. Fig. 6 represents a view in perspective of the file holder detached. Fig. 7 represents a view in perspective of the sleeve and pin detached upon which one end of the file holder supporting carriage is mounted.

In carrying out my invention I provide a pair of brackets 5 which are secured in spaced relation to each other and in suitable manner to a work bench or other object to which the filing machine is to be connected. The brackets are provided against their lower portions with yokes 6 within which some suitable clamping means as indicated at 7 may be arranged, whereby a saw blade 8 may be secured in position relatively to the filing machine. Suitable shoes 9 formed at the upper portions of yokes 6 serve as means against which the toothed edge of the saw blade may rest in order to properly position the saw in the machine. Through eyes formed in the upper portions of brackets 5 rotatably extends a rod 10 having collars 11 engaging against the brackets for preventing longitudinal shifting movement of said rod. The outer ends of the rod are threaded for the reception of wing nuts 11ª which nuts are adapted to be turned into engagement with the eyes formed on the end bars 12 of the supporting frame, through which eyes the rod 10 extends, whereby to bind them against brackets 5 in order to maintain the supporting frame in adjusted position. The end bars 12 of the frame are connected to the ends of bar 13, preferably being formed integrally therewith. The rod 10, bars 12, and rod 13 form the supporting frame, and this frame is adjustable upon the axis of rod 10, and may be maintained in adjusted position in the manner set out. The rods 13 and 10 extend in parallel and spaced relation to each other.

The frame is adapted to support a carriage on which the saw holder is mounted. This carriage is in the nature of a metallic plate having a reduced central portion 14, whereby heads 15 are formed adjacent the ends of the plate. These heads near their lateral edges are provided with alined bores through which rods 26 forming a portion of the file holder slidably extend. The head 15 adjacent the outer end of the carriage is recessed or cut away at its upper portion as at 16 to provide room for a thumb nut 17 which is turned upon a pin 18 carried by a sleeve 19, which sleeve slidably encompasses the rod 13. The pin 18 extends through a slot 20 provided longitudinally of the carriage adjacent the outer end thereof. The inner head 15 is provided with a collar 21 rising vertically from the carriage, and through this collar slidably extends a pin 22 carried by a sleeve 23, which sleeve is mounted upon the rod 10. The carriage may be oscillated upon the pin 22 as a pivot point, and may be retained in set angular relation with respect to the supporting frame by tightening the wing nut 17. At the same time, however, sliding movement of the carriage longitudinally of the supporting frame may be had by reason of the fact that the sleeves 19 and 23 are slidably mounted upon said supporting frame.

By adjusting the supporting frame upon the axis of rod 10 as a center, the correct position for securing the proper bevel of the inclined portions of the saw teeth may be acquired. The angular relation in which the carriage is set relatively to the supporting frame determines the angle at which the saw teeth will be filed transversely. Very accurate and fine adjustment of these parts may be attained, so that uniform and delicate work may be done.

The file holder of which the rods 26 form a part, includes an outer open triangular frame 24 to which the outer ends of rods 26 are connected, and from which frame inwardly extends an arm 25. The latter is arranged between rods 26 and in parallel relation to them, and at its inner end is provided with an axial bore or recess 27 for slidably housing a socket 28. A set screw 29 extending through a boss provided on the arm 25 serves as means whereby the socket may be retained in adjusted position longitudinally with respect to the arm 25. This socket is provided with a triangularly shaped bore or recess for the reception of the outer end of a file 30. The inner end of the file holder is in the nature of a triangular plate 31 to which rods 26 are secured. This plate at its lower apex is provided with an opening arranged in alinement with the arm 25, through which opening the inner reduced end of a handle 32 extends. The handle is rotatably engaged with the plate 31, and is provided with a triangular socket or recess 33 into which the outer end of the file 30 may be extended. In securing a file in place in the holder, the metallic socket 28 is first fitted over the outer end of the file and the inner end of the file is then inserted within the handle 32, and the file and handle extended through the opening in plate 31 until the metallic socket engages within the bore 27 and the shouldered portion of the handle adjacent its outer reduced end engages with the plate 31. The handle is then rotated carrying with it the file 30 until the latter has attained the proper angular relation with respect to the saw teeth, and the set screw 29 is then turned home. Additional means for preventing accidental rotation of handle 32 is provided, and takes the form of a set screw 34 provided in a boss formed on the lower apex of plate 31. This set screw may be turned into engagement with the handle for retaining the latter in adjusted position.

In order that the file may be set at the proper angular relation for acquiring the desired pitch to the saw teeth, a pointer 35 is provided on the handle and is adapted to coact with a scale 36 suitably inscribed on the outer face of the plate 31. Through this means accurate predetermined adjustment of the file may be acquired. The pin 22 is provided with a reduced portion 37 having graduations 38 provided thereon. A cap 39 is turned upon the upper threaded end of collar 21, and through an opening in this cap the reduced portion 37 extends. The cap is milled or corrugated and is adapted to be retained in adjusted position vertical of collar 21 by means of a spring arm or detent 40 secured upon the carriage and adapted to engage in the corrugations of the cap. The inner end of the carriage may move up and down on the pin 22, so that the file holder rocks upon the rod 13 as a pivot as the file eats downward in the toothed edge of the saw in acquiring the proper depth. In order that the depth attained may be adjusted and may be made uniform at will, adjustment of the cap upon the collar 21 is regulated according to the scale 38, so that if a deep cut is to be made the cap is turned so as to move it upward on the collar 21, and until the upper surface of the cap arrives opposite one of the graduations 38, at which time the cap will have moved far enough so that a predetermined depth of cut will be reached. It will be understood that as the inner end of the file holder settles downwardly as the cut deepens, the upper portion of the cap approaches the upper end of the stem or pin 22, and eventually will engage said pin to limit the downward movement of the file.

The rod 10 is provided longitudinally with a plurality of series of spaced recesses or indentations as indicated at 41. The indentations in each series are equally spaced one from another, and the space between the indentations in the different series varies. Each series of indentations is adapted to correspond with a saw having a certain number of teeth to the inch, that is, if a saw having eight teeth to the inch is to be filed, then the series of indentations in which eight indentations to the inch occur, will be used in the manner to be set out. At one end of sleeve 23 is formed a vertically arranged housing 42 in which a pin 43 is arranged. This pin adjacent its lower end is provided with a collar 44 and between this collar and a closure 45 which is detachably engaged in the upper end of the housing, is arranged a spring 46 for normally maintaining the point of the pin downwardly in engagement with rod 10. The lower end of this pin is adapted to engage in the indentations occurring in the uppermost series 41. The pin thus serves as means for preventing longitudinal movement of the carriage with respect to the supporting frame during the filing of the saw teeth, but may of course be shifted forcibly to engage in the successive indentations of the series. In this manner uniformity in the distance apart of the saw teeth may be acquired. In order that the rod may be adjusted so that the desired series of indentations will be uppermost, the thumb nuts 11 may be loosened and subsequently to the acquisition of the desired adjustment, may be again tightened. The pin 22 is provided longitudinally with grooves or corrugations for receiving a suitable lubricant.

Although I have described the preferred embodiment of my invention, I may desire to make such changes in the construction, combination, and arrangement of parts thereof, as do not depart from the spirit of the invention and the scope of the appended claims.

I claim:—

1. A saw filing machine comprising a pair of spaced brackets having means for clamping a saw blade in position, a supporting frame carried by the brackets and adjustable upon an axis extending through said brackets, means for retaining the supporting frame in adjusted position, a carriage having a vertical collar provided at one end and a longitudinally extending slot provided at its other end, a sleeve carried slidably and rotatably upon the supporting frame and being provided with a pin extending through the slot, means carried by the pin whereby the carriage may be locked with respect to the sleeve, a second sleeve slidably and rotatably carried by the supporting frame and being provided with a pin extending through said collar, coacting means between the collar and last said pin for determining the downward movement of the carriage relatively to the saw blade, a file holder including a pair of spaced rods slidably extending through bores provided in the carriage, means for detachably and adjustably supporting a file within the file holder, means for predetermining the position to which the file should be adjusted, and coöperating means between the supporting frame and the second said sleeve for determining successive movements of the carriage longitudinally of the supporting frame in properly spacing the teeth of a saw.

2. A saw filing machine including a pair of spaced brackets providing means whereby a saw blade may be clamped therein, a supporting frame carried by the brackets and adjustable upon an axis extending through said brackets, a carriage, means connected with the supporting frame and with the carriage for supporting the latter in such manner that it may be adjusted longitudinally with respect to the supporting frame vertically upon a pivot lying in the supporting frame and horizontally upon a pivot lying in the supporting frame, means for retaining the carriage in its horizontally adjusted position at will, coöperating means between the carriage and its supporting means whereby the downward movement of the carriage in its vertical adjustment may be terminated at various heights, a file holder slidably supported by the carriage and movable therewith, and coöperating means between the carriage and the supporting frame whereby the former may be adjusted at successive equi-distant points longitudinally of the supporting frame.

3. A device of the class described including a supporting frame adjustable upon a horizontal axis, a carriage connected with the supporting frame and adjustable upon a horizontal and a vertical axis, means whereby the downward movement of the carriage in its vertical adjustment may be terminated at various levels, means whereby the carriage may be retained in predetermined angular relation with respect to the supporting frame, a file holder slidably supported by the carriage, and means whereby the carriage may be temporarily retained at successive intervals longitudinally with respect to the supporting frame.

4. A device of the class described including a supporting frame, a carriage movable longitudinally with respect thereto and movable in a vertical plane upon a pivot point occurring in the supporting frame, a collar provided on the carriage, a sleeve carried by the supporting frame and movable longitudinally thereof, a stem carried by the sleeve and slidably extending through said collar, said stem being provided with a graduated and reduced upper end portion, a cap carried by the collar and provided with an opening through which the upper reduced end portion extends, said cap being adjustable longitudinally with respect to the collar, means for retaining the cap in adjusted position, said cap adapted to cooperate with the stem in determining the downward movement of the carriage.

5. A device of the class described including a supporting frame providing a pair of spaced parallel rods, a carriage provided at one end with a collar and at its opposite end with a longitudinally extending slot, a sleeve carried by one of the rods and provided with a threaded pin extending through the slot, means carried by the threaded pin for clamping the carriage relatively to the sleeve, a second sleeve carried by the other rod and provided with a stem extending through said collar, and means adjustable on the collar for coacting with the stem whereby to limit the downward movement of the carriage.

6. A device of the class described including a supporting frame providing a pair of spaced parallel rods, a carriage, a file holder slidably supported by the carriage, means for establishing a vertical and horizontal pivotal connection and a sliding connection longitudinally of the carriage, between the carriage and one of the rods, means for locking the carriage in its horizontal angular relation with the frame, a stem rotatably and slidably mounted on the other rod, and coöperating means between the carriage and stem for limiting the downward movement of the carriage at a predetermined point.

7. A device of the class described including a supporting frame providing a pair of spaced parallel rods, a carriage, a file holder slidably supported by the carriage, means connecting the carriage and one of the rods whereby said carriage may be adjusted into horizontal and vertical angular relation with the carriage, means whereby the carriage may be locked in its horizontal angular relation with the frame, and coöperating means between the carriage and the opposite rod whereby the downward movement of the carriage relatively to the frame may be stopped when the carriage moves into a predetermined vertical angular relation with the frame.

8. A device of the class described including a supporting frame, a carriage mounted for sliding movement longitudinally of the frame, and having at one end means coöperating with the frame whereby the carriage may be moved into horizontal and vertical angular relation with the frame, said carriage having at its other end means coöperating with the frame for determining the downward movement of the carriage relatively to the frame when said carriage has moved into a predetermined vertical angular relation with the frame.

HJALMAR INGOLF HANSON.

Witnesses:
C. H. LUN,
G. C. MOGEN.